(12) United States Patent
Gold et al.

(10) Patent No.: US 10,356,098 B2
(45) Date of Patent: *Jul. 16, 2019

(54) SYSTEMATIC ENHANCEMENT OF CONTACT INFORMATION

(71) Applicants: Barry Gold, Whitinsville, MA (US); Karen Sallick, Westport, CT (US)

(72) Inventors: Barry Gold, Whitinsville, MA (US); Karen Sallick, Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,551

(22) Filed: Dec. 21, 2017

(65) Prior Publication Data

US 2018/0183797 A1 Jun. 28, 2018

Related U.S. Application Data

(63) Continuation-in-part of application No. 15/172,412, filed on Jun. 3, 2016, now abandoned, which is a continuation of application No. 14/183,837, filed on Feb. 19, 2014, now Pat. No. 9,386,020.

(60) Provisional application No. 61/766,390, filed on Feb. 19, 2013.

(51) Int. Cl.
*H04L 29/06* (2006.01)
*G06F 21/62* (2013.01)
*G06F 16/951* (2019.01)

(52) U.S. Cl.
CPC ............ *H04L 63/10* (2013.01); *G06F 16/951* (2019.01); *G06F 21/6245* (2013.01)

(58) Field of Classification Search
None
See application file for complete search history.

(56) References Cited

U.S. PATENT DOCUMENTS

| | | | |
|---|---|---|---|
| 6,275,824 B1 * | 8/2001 | O'Flaherty | G06F 21/6227 |
| 6,687,362 B1 | 2/2004 | Lindquist et al. | |
| 6,694,353 B2 | 2/2004 | Sommerer | |
| 6,701,348 B2 | 3/2004 | Sommerer | |
| 7,149,782 B2 | 12/2006 | Sommerer | |
| 7,243,097 B1 | 7/2007 | Agrawal et al. | |

(Continued)

FOREIGN PATENT DOCUMENTS

EP          1193587 A2      4/2002

OTHER PUBLICATIONS

International Search Report for PCT Application No. PCT/US/2014/017089. dated Jul. 3, 2014. 6 pages.

(Continued)

*Primary Examiner* — Kaveh Abrishamkar
(74) *Attorney, Agent, or Firm* — Gearhart Law, LLC

(57) ABSTRACT

A system for systematically enhancing consumer and business contact information is disclosed. A server located "in the cloud" systematically controls a database of contact data elements, some of which have preferred and/or user-selected privacy protocols and update availability. These protocols and availability may restrict some data elements from being shared unless a data-owner's explicit permission is obtained. When the server receives a request for such a restricted data element, the server may issue an email or text message in order to obtain the necessary permissions. If permission is granted, the server then supplies the requested data. Beyond this base functionality, expanded services provide complementary enhancement functionality.

19 Claims, 1 Drawing Sheet

(56) References Cited

U.S. PATENT DOCUMENTS

| | | |
|---|---|---|
| 7,254,573 B2 | 8/2007 | Burke |
| 8,032,559 B2 | 10/2011 | Ring et al. |
| 9,386,020 B2 | 7/2016 | Gold et al. |
| 9,686,248 B2* | 6/2017 | Dover ................... H04L 63/061 |
| 2004/0203901 A1* | 10/2004 | Wilson ................... H04W 64/00 455/456.1 |
| 2006/0085431 A1 | 4/2006 | Burns et al. |
| 2006/0229063 A1 | 10/2006 | Koch |
| 2007/0078734 A1* | 4/2007 | Oren ................... G06Q 20/102 705/26.1 |
| 2007/0266118 A1 | 11/2007 | Wilkins |
| 2008/0201327 A1* | 8/2008 | Seth ................... G06F 17/30259 |
| 2009/0171979 A1 | 7/2009 | Lubarski et al. |
| 2010/0064307 A1* | 3/2010 | Malhotra ............... H04H 60/80 725/24 |
| 2010/0305988 A1 | 12/2010 | Agrawal |
| 2011/0029610 A1 | 2/2011 | Chao |
| 2011/0258159 A1 | 10/2011 | Mitchell |
| 2012/0066262 A1 | 3/2012 | Greenberg |
| 2013/0304542 A1 | 11/2013 | Powell |
| 2014/0044243 A1* | 2/2014 | Monegan ............. H04M 3/493 379/88.01 |
| 2014/0258707 A1* | 9/2014 | Denny ................. H04L 9/0822 713/150 |

OTHER PUBLICATIONS

International Patentability Report for PCT App. No. PCT/US/2014/017089, dated Jul. 3, 2014, 5 Pages.
European Search Report Annex to Communication, Application No. 14754346.6. dated Oct. 13, 2017. 3 Pages.
European Search Report, Application No. 14754346.6. dated Jul. 8, 2016. 7 Pages.
International Preliminary Report for PCT Application No. PCT/US/2014/017089. dated Sep. 3, 2015. 5 pages.

* cited by examiner

SYSTEMATIC ENHANCEMENT OF CONTACT INFORMATION

CLAIM OF PRIORITY

This application is a continuation-in-part of U.S. application Ser. No. 15/172,412 filed on Jun. 3, 2016, which claims priority to U.S. application Ser. No. 14/183,837 filed on Feb. 19, 2014, which claims priority to U.S. Application 61/766,390 filed on Feb. 19, 2013, the contents of all of which are fully incorporated herein by reference in their entirety.

FIELD OF THE INVENTION

The invention relates to systems and methods for systematically enhancing (e.g., updating and expanding) personal contact information accessible via an electronic communications device, and more particularly, to systems and methods of enhancing information while respecting user privacy and/or preference protocols and stipulations.

BACKGROUND OF THE INVENTION

Electronic personal communications devices such as, but not limited to, smart phones and tablet computers, frequently have, or have access to, databases of contact information somewhat tailored to the user of the device. Such databases are very useful, but often contain incomplete or inaccurate records as some, or all, of a contact's information may change over time or may be absent. Updating such databases may need to be an ongoing task, and may be tedious and time consuming when done manually. Systematic contact information enhancement apps and services are therefore desirable. Users of such services may, however, be concerned about their privacy. They may, for instance, not want their wireless phone numbers or email addresses known to other people without their permission.

The present invention addresses these issues and concerns by providing a system and method for systematically enhancing contact information, while providing privacy and security protocols so that a subscriber's privacy choices are respected related to what could be deemed by the user to be "sensitive information" like wireless phone numbers and email addresses.

DESCRIPTION OF THE RELATED ART

The relevant prior art wiring includes:

U.S. Pat. No. 7,940,910 issued to Chatterjee, et al. on May 10, 2011 entitled "Directory integration in mobile systems" that describes embodiments for generating a sorted integrated directory. The sorted integrated directory integrates contacts from disparate directories into a common directory. The formation of the integrated directory includes receiving contacts from multiple directories. The contacts represent or are formed under multiple data structures, with one data structure corresponding to one of the directories. The received contacts are converted into contact objects. The contact objects, each of which represents a contact, all include or are formed under a common data structure. An integrated directory is generated or formed from the contact objects. The integrated directory thus includes a set of contacts of the disparate source directories.

U.S. Pat. No. 7,660,857 issued to Smith, et al. on Feb. 9, 2010 entitled "Systems and methods for automatically updating electronic mail access lists" that describes a system and method for accepting a recipient identifier, wherein the recipient identifier can be used to identify an electronic mail (email) recipient; generating a petition based on the recipient identifier and at least one petition rule, wherein the at least one petition rule includes at least one of: 1) a sender identification method; and 2) a recipient; and wherein the petition can be used by a email provider to allow a recipient to receive email from a sender.

U.S. Pat. No. 8,131,569 issued to Maresh, et al. on Mar. 6, 2012 entitled "Methods, systems, and devices for modifying medical files" that describes methods, systems, and devices for managing, transferring, modifying, converting and/or tracking medical files and/or medical system messages. In certain embodiments, the foregoing may generally be based on requesting medical files at a first medical facility, identifying the requested medical files at a second medical facility, initiating a secure network connection between the first and second medical facility, modifying a header portion of the medical files based on patient identification information created by the first medical facility, and other processing steps.

U.S. Pat. No. 7,822,189 issued to Rana, et al. on Oct. 26, 2010 entitled "Searching multiple directories and generating a sorted integrated directory" that describes embodiments for searching multiple directories. The searching includes remote searching and local searching. Local searching is performed against the local integrated phonebook on a client device. In contrast, remote searching is performed against one or more directories or directory types of an enterprise server (e.g. corporate directory, etc.). The local directory on the client device therefore effectively functions like a cache of information of one or more of the directories of the enterprise server, where the cache is stored locally on the client device.

Various implements are known in the art, but fail to address all of the problems solved by the invention described herein. Various embodiments of this invention are illustrated in the accompanying drawings and will be described in more detail herein below.

SUMMARY OF THE INVENTION

The present invention relates to systems and methods for systematically enhancing databases of contact information such as, but not limited to, the databases commonly associated with electronic communications devices, including mobile communications devices.

A method for systematically enhancing a database of contact information on an end-user electronic communications device having the steps of providing a manager server having programmed instructions for systematically controlling a server database, said database comprising a plurality of contact data elements, one or more of said contact data elements being obtained from a data-owner programmed app operative on a contact data-owner electronic communications device via said manager server and wherein one or more of said contact data elements comprises a preferred privacy protocol selected via said contact data-owner electronic communications device; receiving a request, from an end-user programmed app operative on said end-user electronic communications device, for one or more of said contact data elements stored on said server database, said contact data element being identified by a known data element of said data-owner contact data elements; systematically applying, by said manager server, said preferred privacy protocol of said requested communications data element; and, if said preferred privacy protocol allows, systematically supplying, by said server manager, a requested contact data element to said programmed app operative on said end-user electronic communications device.

In a preferred embodiment, a server that may be located "in the cloud" may systematically control or contain a database of contacts. The database may, for instance, contain contact or locator data elements such as, but not limited to, people and/or company names, addresses, telephone numbers, email addresses, company or private URLs, or some combination thereof.

Some or all of these database elements may have been obtained from an owner of the data via a programmed app that may be operative on an electronic communications device. In such an instance, the data element may also contain, or be associated with, a preferred privacy protocol. Such a preferred privacy protocol may, for instance, include instructions such as, but not limited to, never share my wireless phone number, only share my email address with my permission, or some combination thereof. Where the data owner's permission may be required for sharing, the server may automatically request that permission via an electronic means such as, but not limited to, an email, a voicemail, a permission based SMS message, voice activation or some combination thereof.

In a preferred embodiment, when the manager server receives a request from an end-user, or from a programmed app operative on their electronic communications device, the server may automatically apply any such privacy protocol associated with the requested data element. Such a request may, for instance, take the form of a contact's known email address and be a request for their wireless phone number. Only if the protocol allows will the requested data be supplied.

It is an object of the present invention to provide an elective, systematized service for end-users to update their contact databases while maintaining the privacy of data owners.

Yet another object of the present invention is to provide a contact update service that systematically maintains correct information on a scheduled, pre-authorized basis.

Still another object of the present invention is to update contact information while systematically allowing the end-user to maintain control of which contact information is updated.

Still another object of the present invention is to systematically route those user requests for contact information that fail to generate available updates to expanded data service functionality.

DESCRIPTION OF THE PREFERRED EMBODIMENTS

Figure 1:
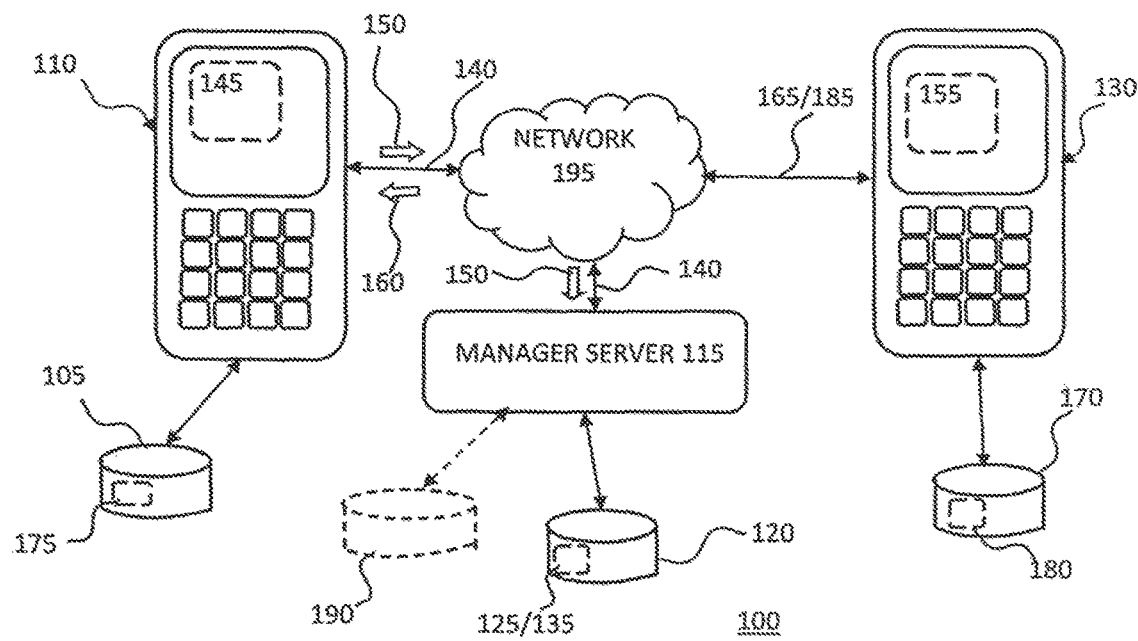
FIG. 1 shows a schematic overview of a preferred embodiment of the present invention.

The preferred embodiments of the present invention will now be described with reference to the drawings. Identical elements in the various figures are identified with the same reference numerals.

Reference will now be made in detail to embodiments of the present invention. Such embodiments are provided by way of explanation of the present invention, and are not intended to be limited thereto. In fact, those of ordinary skill in the art may appreciate upon reading the present specification and viewing the present drawings that various modifications and variations can be made thereto.

FIG. 1 shows a schematic overview of a preferred embodiment of the present invention, which may be a system 100 for systematically enhancing a database of personal contact information that may be part of, or accessible to, an end-user.

In a preferred embodiment, the end-user may have an end-user electronic communications device 110 that may be running an end-user programmed app 145. The end-user app 145 may, for instance, be programmed so as to systematically examine one or more personal contact information records 175. Where the app locates an element that may be missing or outdated, on the end-users personal contact information database 105, the app may then systematically establish contact with a manager server 115 that may have access to a more comprehensive and/or up-to-date database 120 of contact data elements 125.

A contact record may, for instance, contain locator data elements such as, but not limited to, a record identifier, a contact's first name, a contact's last name, a company name, a contact's mobile phone number, work phone number, home phone number, email address, street or mailing address, city and state of residence, zip or postal code, country of residence or some combination thereof.

A request for further data may, for instance, require sufficient data elements to identify a person such as, but not limited to, data elements such as, but not limited to, a record identifier, a contact's first and last name, a last name and company name, a contact's mobile phone number, work phone number, home phone number, email address, a contact's street or mailing address including city, state and ZIP Code together in their entirety.

The known data elements 150 may be transmitted as part of a request 140 for further data elements. The request may, for instance, be made via an electronic communications network 195 such as, but not limited to, the Internet. On receiving the request, the manager server 115 may then query the server database 120 for a matching record containing the data elements specified in the request 140 and further contact data elements 125. The server database 120 may also find that the contact data elements 125 include, or are associated with, one or more preferred privacy protocols 135.

These preferred privacy protocol 135 may have been supplied by the data owner using a data-owner programmed app 155 running on a contact data-owner electronic communications device 130. The data-owner personal contact information 180 may, for instance, also reside on a data-owner database 170.

A preferred privacy protocol 135 that may have been selected, or specified, by the data-owner when subscribing to scheduled, pre-authorized enhancement services may take a number of forms that may depend on specific scenarios.

When requesting information, subscribing to a service or simply updating preferences, a data requester may for instance specify preferences, or limits, on how any requests may be made by the end-user programmed app 145 operative on their end-user electronic communications device 110. These request preferences may include instructions such as, but not limited to, allowing text messages to be sent from the end user, or data requester, phone, allowing emails to be sent from the phone, to never ask how or what to send, or to ask how or what to send on a record by record basis, i.e., for each request, or some combination thereof.

When an end-user, or an end-user programmed app 145 running on the end-user electronic communications device 110 decides to request information, an existing contact may be selected as the one for which more, or more current, information is desired. The end-user may, for instance, already have the contact's email address, but would also like to have his or her wireless phone number. The end-user programmed app 145 may then send an email or SMS from the end-user electronic communications device 110 to the manager server 115 device requesting the wireless phone number of the contact identified by the known data element 150 that may, for instance, be the known email address, or other known data sufficient to identify the contact. The manager server 115 may then send a permission request email 165 to the data-owner programmed app 155 running on the contact data-owner electronic communications device 130. If the request is allowed, or approved, the data-owner programmed app 155 may then return the requested information or an approval for the manager server 115 to supply the requested information, to the manager server 115. The manager server 115 may then send the requested and approved requested contact data element 160 on to the end-user programmed app 145.

In a second scenario, the end-user may know the contact's wireless phone number and may want to obtain his or her email address.

The end-user programmed app 145, or the manager server 115, may then send a permission request SMS or text message 185 message to the data-owner programmed app 155 on the contact data-owner electronic communications device 130. The data-owner programmed app 155 may then obtain the requested data-owner personal contact information 180 from the data-owner database 170 either directly to the end-user programmed app 145 or to the manager server 115 for storing on the contact data elements 125 and for forwarding on to the end-user programmed app 145. The data-owner programmed app 155 may instead send authorization to the data-owner programmed app 155 to obtain and send the requested data. The data-owner programmed app 155 may then obtain the requested data from the server database 120 or from a third-party database 190, and then send the data to the end-user programmed app 145 on the end-user electronic communications device 110.

When the data-owner programmed app 155 receives a request for data, it may first have the data-owner select or update privacy protocols. The privacy protocols may include instructions such as, but not limited to, to systematically ask permission to provide a requested email address, to systematically ask permission to provide a wireless phone number, to systematically provide a requested email, to systematically provide a wireless phone number, to systematically never provide a requested email, to systematically never provide a requested wireless phone number or some combination thereof.

In a preferred embodiment, the default privacy protocol may be to always ask permission to provide a requested email address and to always ask permission to provide a wireless phone number.

If no response is received, the request may be repeated a number of times at a later time or date. In a preferred embodiment, if no response is received to a first request, the request is re-sent 48 hours later. No response to the second request is taken as a "NO" for this particular request only.

In a preferred embodiment, the recipient of the request, i.e., the data owner, may verify the requested information by entering the requested email and/or wireless phone number into an input box and explicitly clicking a button or icon to share the data.

The end-user programmed app 145 may inform the end-user when a response has been received and may systematically update the contact record or personal contact information 175 on the database 105 of personal contact information.

According to an embodiment of the present invention, each user has the ability to initiate each request for contact updates on-demand. According to another embodiment of the present invention, the system 100 enables each user to schedule contact update requests, data delivery preferences, and pre-authorized security approvals and payment approvals.

According to an embodiment, the user may initiate a contact update from the end user electronic communications device 110. This request may be made using, e.g., a smartphone app, text messaging, etc. However, other methods for making this request may also be used, while maintaining the spirit of the present invention. For example, the request may be made using voice activation.

According to an embodiment, the user initiates a contact update by supplying at least two contact fields of data by voice, such as name and phone number, or email, or address. Using a voice recognition and processing capability that is licensed or native to the end-user electronic communications device, and which may or may not be proprietary, the user may request updated contact data in multiple formats. According to an embodiment, the data update is added to the contract list native to the end-user electronic communications device 110 in all cases. The user may also elect to receive a phone number orally, however in all cases delivered to the native phone application for use in generating an immediate phone call.

System 100 enables users to initiate each request for contact updates on-demand. According to another embodiment, the invention further provides for a preference-based system 100 which enables the user to schedule contact update requests, data delivery preferences, and pre-authorized security approvals and payment approvals.

According to embodiments of the present invention, such preference-driven capabilities may include: updates, on a monthly or quarterly basis, of a single contact or the entire contact list stored on the end-user electronic communications device 110; updates, on a monthly or quarterly basis, of only those contacts stored on the end-user electronic communications device 110 that have previously received data updates; updates, on a monthly or quarterly basis, of only those contacts stored on the end-user electronic communications device 110 contacts that have never previously received data updates; or some combination thereof.

According to an embodiment, preference-driven capabilities may further include: the capability to update only the consumer data for the contacts stored on the end-user electronic communications device 110; the capability to update only the business data for the contacts stored on the end-user electronic communications device 110; the capability to update only the contacts stored on the end-user electronic communications device 110 for which the subject contact has affirmatively opted into the sharing of publicly available contact data; the capability to use a "push" service that delivers updates in real time as soon as a third-party data source updates some or all contacts that have been preauthorized by the user (through the preference-setting process); and the capability to make an election to make use of Data Enhancement Services.

The present invention provides for users to access expanded contact data services made available using an integrated routing capability. Together, this is referred to as the Expanded Data Services.

According to an embodiment, the user may elect to activate preferences that route certain contact data requests to the Expanded Data Services. According to an embodiment, the preferences route such requests after the base enhancement service has failed to find data elements in the third party databases that match the data elements supplied in the update request from the end-user electronic communications device. According to other embodiments, such a routing step is not performed.

According to an embodiment, if the matching data elements cannot be identified, evaluated, or made available, the requests may be authorized by the user to be systematically routed to a supporting Data Hygiene Service, whereby contact data is processed through a combination of algorithms and/or a manual review to correct data errors such that Data Hygiene-improved contact information thereafter will be successfully handled by the system.

According to another embodiment, if the matching data elements cannot be identified, evaluated, or made available, the requests may be authorized by the user to be systematically routed to a Concierge Service, whereby contact data is processed through a research process to correct and add contact data, and perhaps data that complements contact data, such that the Concierge Service-improved contact information thereafter will be capable of being successfully handled by the system.

According to another embodiment, the system 100 provides for the capability for users to initiate a Custom Search for contacts and contact data that, like the Concierge Service, requires an element of manual processing. According to an embodiment, the user may use the app to search contacts stored on the end-user electronic communications device 110 to select contacts and initiate one or more searches for information about the selected contacts. The results of such a search would be highly structured by the invention and returned to the screen on the end-user electronic communications device 110 using a form that enables the end user to review search results and choose, from the search results, any data elements that should be added to the contacts stored on the end-user electronic communications device 110.

According to an embodiment, the system provides for the Data Hygiene Service, the Concierge Service, and/or the Custom Search Service to be selected by the user on-demand or by pre-authorizing and scheduling use of the integrated routing capability.

Figure 2:
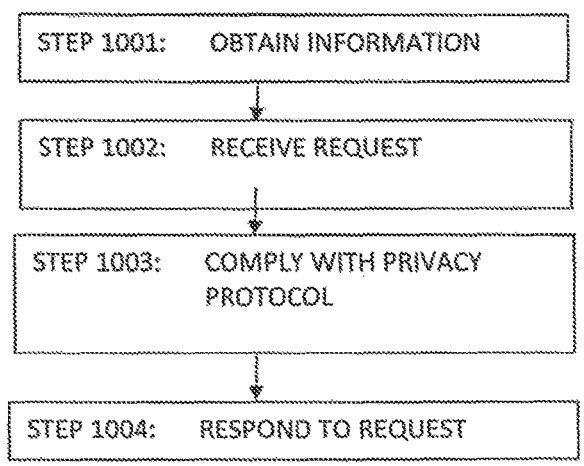
FIG. 2 shows a schematic flow diagram indicating various steps that may be used in a preferred embodiment of the present invention.

FIG. 2 shows a schematic flow diagram indicating various steps that may be used in a preferred embodiment of the present invention.

In step 1001, the manager server 115 may first obtain data to populate the server database 120 with contact data elements 125. This data may be obtained from one or more third party databases 190, or may be obtained from end-users or subscribers when they join the service, or at periodic time intervals while the end-user is a subscriber to, or a member of, the automatic enhancement of personal contact information service. When obtaining contact data from an end-user, the manager server 115 may also obtain privacy preferences and/or on how requests emanating from their end-user electronic communications device 110 may be made, as detailed above.

In step 1002, the manager server 115 may receive a request for a contact data element. The request may contain sufficient data to identify the data-owner of the requested data element. The request may be made because the personal contact information 175 on the end-user's database 105 of personal contact information may have incomplete data, or data that may be outdated. The end-user programmed app 145 may, for instance, select to systematically check or confirm any data elements that may have been obtained prior to a certain date. In a preferred embodiment, any data that is deemed to be more than 12 months old may be systematically checked for accuracy.

According to an embodiment of the present invention, each user has the ability to initiate each request for contact updates on-demand. According to another embodiment of the present invention, the system 100 enables each user to schedule contact update requests, data delivery preferences, and pre-authorized security approvals and payment approvals.

According to an embodiment, the user may initiate a contact update from the end user electronic communications device 110. This request may be made using, e.g., a smartphone app, text messaging, etc. However, other methods for making this request may also be used, while maintaining the spirit of the present invention. For example, the request may be made using voice activation.

According to an embodiment, the user initiates a contact update by supplying at least two contact fields of data by voice. Using a voice recognition and processing capability that is licensed or native to the end-user electronic communications device, and which may or may not be proprietary, the user may request updated contact data in multiple formats. According to an embodiment, the data update is added to the contact list native to the end-user electronic communications device 110 in all cases. The user may also elect to receive a phone number orally, however all responses are delivered to the native phone application for use in generating an immediate phone call.

In step 1003, the manager server 115 may comply with any relevant privacy protocol associated with the requested data element. In a preferred embodiment, the default privacy protocol may be to systematically ask permission to provide a requested email address and to systematically ask permission to provide a wireless phone number. This default protocol may be changed at any time by the data-owner.

In step 1004, the manager server 115 may after having complied with any applicable protocols, received any required permissions, and obtained any required data, respond to the request by either supplying the requested data to the end-user programmed app 145 or informing the end-user programmed app 145 that the requested data cannot be supplied.

In obtaining requested data, the manager server 115 may consult one or more third party databases 190. These third-party databases 190 may be broadly classified as business-to-consumer (B2C), business-to-business (B2B) or social media (SM) databases. In a preferred embodiment, in the event that multiple, non-identical responses to the request are found in multiple instances of B2C, B2B and SM databases, system logic integrated into the manager server 115 is defined to identify, evaluate and make available to the end-user programmed app 145 the highest confidence response or responses.

In a preferred embodiment, when the end-user programmed app 145 has sent more than one request at any one time, the manager server 115 may first respond by providing the end-user programmed app 145 with data such as, but not limited to, a number of records checked, a number of records matched, a number of available changes to be made, or some combination thereof.

The end-user may then use the end-user programmed app 145 to decide which of the available updates to accept. This selection may be significant in that the end-user may be charged based on the number of change requests made, or may be limited to making only a certain number of change requests within a certain time period, or some combination thereof.

Once the manager server 115 receives a further request to make one or more of the available changes, the manager server 115 may then supply the necessary information to adopt the requested available changes.

In a preferred embodiment, the end-user may use the end-user programmed app 145, in the event that the manager server 115 is unable to find matching data from the third-party databases 190, to authorize the systematic routing of said unmatched data to expanded data services, whereby unmatched contact information is processed through a combination of algorithms and/or manual review to correct and/or append missing or erroneous contact information.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for updating a database of personal contact information on an end-user electronic communications device, comprising:
   providing at least a first and second end-user electronic communications device, with each end-user device being capable of coupling to a communications network, wherein
      said first end-user electronic communications device is operated by a first user and said second end-user electronic communications device is operated by a second user, and wherein
      said first and/or said second end-user electronic communications device stores, in a contact database, at least one contact data element pertaining to said second user or said first user respectively;
   providing a manager server having programmed instructions for controlling a server database, said server database comprising a plurality of contact data elements being obtained from a program operative on said first and/or second end-user electronic communications device via said manager server, wherein
      one or more of said plurality of contact data elements comprises a preferred permission protocol selected via said first and/or second user;
   receiving a request, from said program operative on said first user and/or second end-user electronic communications device, for one or more of said plurality of contact data elements stored on said server database, said one or more of said plurality of contact data elements being identified by said at least one contact data element of said first and/or second user; and
   systematically applying, by said manager server, said preferred permission protocol of requested said one or more of said plurality of contact data elements, wherein
      if said preferred permission protocol allows, systematically supplying, by said server manager, a requested contact data element to said program operative on said first and/or second end-user electronic communications device, and wherein
      if said preferred permission protocol does not allow supplying of said requested contact data element, said first or second user generating and sending a permission request for said requested contact data element to said first or second user.

2. The method of claim 1 wherein said at least one contact data element is an email address and wherein said permission request is generated and sent via email to said first and/or second user, said email comprising an identity of said requester, a nature of said one or more contact data elements requested, and an allow or disallow option.

3. The method of claim 1 wherein said at least one contact data element is a phone number and wherein said permission request is generated and sent via a permissioned text message, said text message comprising an identity of said requester, a type of said one or more contact data elements requested, and an allow or disallow option.

4. The method of claim 1 wherein supplying said requested contact data element further comprises using said at least two data elements to query said database, and wherein said matches in said database are evaluated, identified and made available to an end-user programmed application as a highest confidence response or responses.

5. The method of claim 1 wherein said database of contact database elements is configured to query at least one third party database.

6. The method of claim 5 wherein said at least one third party database is selected from the group consisting of:
   at least one B2C contact information database,
   at least one B2B contact information database; and
   at least one SM contact information database, and
   wherein supplying said requested contact data element further comprises using said at least two data elements to obtain a first matching data element from said B2C database, at least one matching data element from said B2B database, and/or at least one matching data element from said SM database, and
   wherein said matching data elements are identified, evaluated, and made available as a highest confidence response or responses.

7. The method of claim 1 further comprises receiving a plurality of requests from said program and wherein said manager server responds by providing a number of records checked, a number of records matched and a number of possible changes available to be made on a personal contacts database associated with said first and/or second end-user electronic communications device.

8. The method of claim 7 further comprising receiving a request to make one or more of said possible changes, and supplying said information to make said requested possible changes.

9. The method of claim 3 wherein said at least one contact data element is a wireless phone number.

10. A method for systematically updating a database of personal contact information on an end-user electronic communications device, comprising:
    providing at least a first and a second end-user electronic communications device, with each end-user device being capable of coupling to a communications network, wherein
       wherein said first end-user electronic communications device is operated by a first user and said second end-user electronic communications device is operated by a second user, and wherein said first and/or said second end-user electronic communications device stores, in a contact database, at least one contact data element pertaining to said second user or said first user respectively;

providing a manager server having programmed instructions for systematically controlling a server database, said server database comprising a plurality of contact data elements, wherein one or more of said plurality of contact data elements comprises a preferred permission protocol selected via a user, wherein said server database is capable of querying at least one third party database, and wherein said at least one third party database comprises at least one B2C contact information database and at least one B2B contact information database;

said user receiving a request, from said program operative on said end-user electronic communications device, for one or more of said plurality of contact data elements stored on said server database; and systematically applying, by said manager server, said preferred permission protocol of requested said one or more of said plurality of contact data elements, wherein if said preferred permission protocol allows, systematically supplying, by said server manager, a requested contact data element to said program operative on said end-user electronic communications device, and wherein if said preferred permission protocol does not allow a supplying of said requested contact data element, said server manager generating and sending a permission request for said requested contact data element to said user.

11. The method of claim 10 wherein said at least one contact data element is a personal email address and wherein said permission request is generated and sent via email to said first and/or second end user communications device, said email comprising an identity of said requester, a nature of said contact data element requested, and an allow or disallow option.

12. The method of claim 10 wherein said at least one data element is a phone number and wherein said permission request is generated and sent via an email or text message to said user, said email or text message comprising an identity of said requester, a nature of said contact data element requested, and an allow or disallow option.

13. The method of claim 10 wherein supplying said requested contact data element further comprises using said at least two data elements to query said database, and wherein said matches in said database are identified, evaluated, and made available as a highest confidence response or responses.

14. The method of claim 10 further comprises receiving a plurality of requests from said program and wherein said manager server responds by providing to said first and/or second end user communications device a number of records checked, a number of records matched and a number of changes available to be made on a personal contacts database associated with said first and/or second end-user electronic communications device.

15. The method of claim 10 further comprising receiving a request to make one or more of said possible changes, and supplying said information to make said available changes.

16. The method of claim 12 wherein said at least one data element of said data element is a wireless phone number.

17. The method of claim 10 wherein, when updating said one or more contact data elements, said matching data elements are identified, evaluated, and made available as the highest confidence response or responses.

18. The method of claim 17 wherein said matching data elements are not identified, evaluated or made available, and wherein such requests are authorized by the user to be systematically routed to a expanded data hygiene service, whereby contact data is processed through a combination of algorithms and/or manual review to correct data errors.

19. The method of claim 17 wherein said matching data elements are not identified, evaluated or made available, and wherein such requests are authorized by the user to be systematically routed to the expanded Concierge Service, whereby contact data is processed through a manual research process to correct and add contact data.

* * * * *